June 1, 1926.
G. N. SIMPSON
CAR HOLD-DOWN
Filed Feb. 23, 1926
1,587,193
2 Sheets-Sheet 2
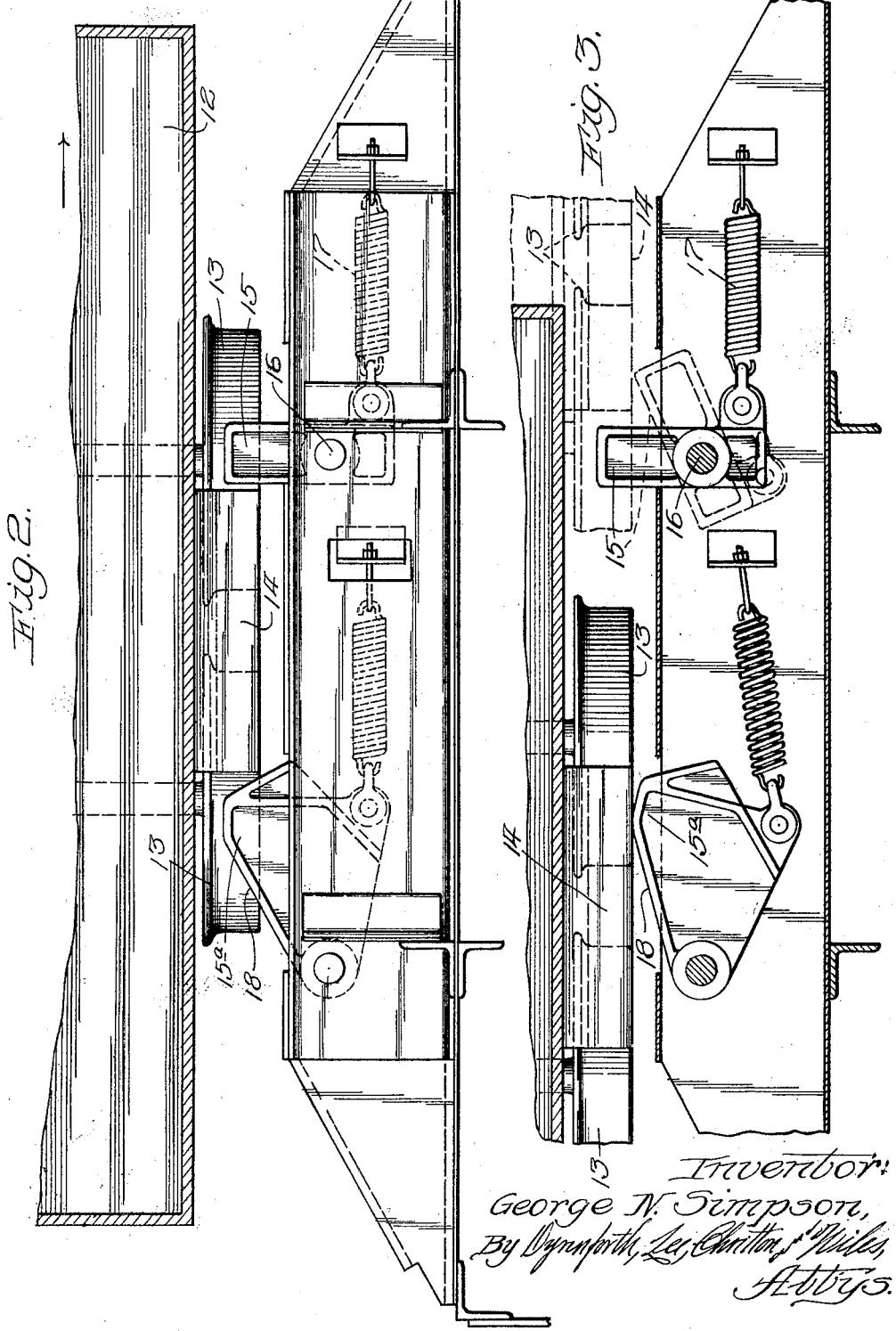

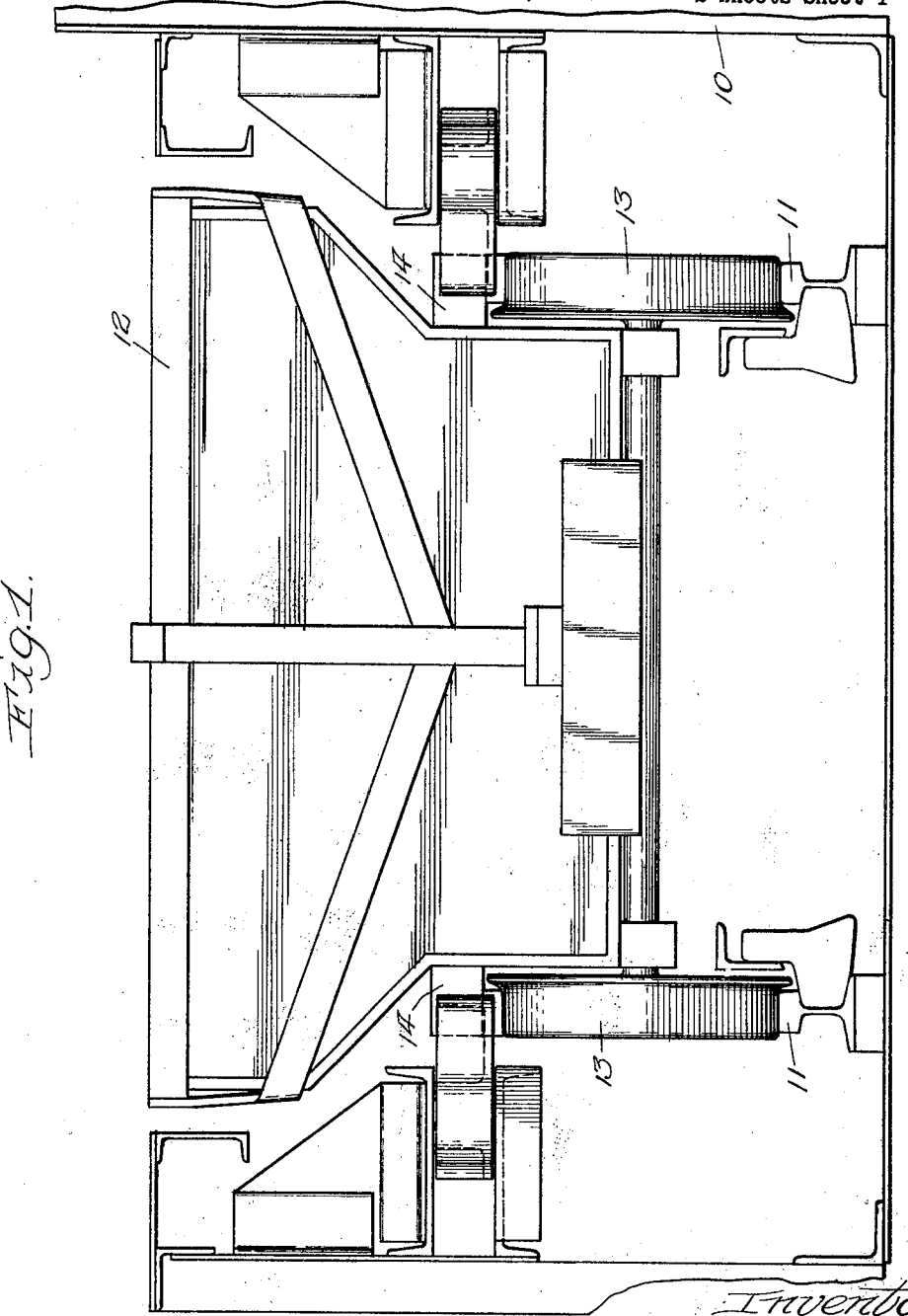

Patented June 1, 1926.

1,587,193

UNITED STATES PATENT OFFICE.

GEORGE N. SIMPSON, OF CHICAGO, ILLINOIS.

CAR HOLD DOWN.

Application filed February 23, 1926. Serial No. 89,923.

This invention relates to improvements in car hold downs and is here shown as embodied in a device adapted for holding a car on the rails during a dumping operation.

For example, in car dumping apparatus, frequently there is provided a tilting, rotating or otherwise movable cage in which the car is contained during the dumping operation. During this operation, the cage is turned to such a position that the car therein would leave the rails if not held in place by some suitable hold down arrangement. For the purpose of illustration, it may be assumed, therefore, that the car shown in the drawings accompanying this specification is contained in a rotatable cage provided with rails; and that in order to dump the car the cage rotates or overturns to such a position that the car would be in danger of leaving the rails unless held down by some suitable means.

For the purpose of holding the car on the rails, I have provided dogs which are arranged in the cage just above the wheels so that when the car is positioned or spotted in the cage, the wheels will be directly under such dogs. These dogs prevent upward movement of the wheels from the rails and consequently hold the car in place. It frequently happens, however, that some part of the body, or running gear of the car, such as, for example, the brake beam, lies in a position just above the wheels where it strikes the dogs in the movement of the car into or out of the dumping cage. One of the features of my invention is the provision of means whereby any projecting part on the car such as the brake beam, for example, lying in the path of which the dogs are situated, is permitted to pass without damage to any of the parts.

Other features and advantages of my invention will appear more fully as I proceed with my specification.

In that form of device embodying the features of my invention, shown in the accompanying drawings, Fig. 1 is a view in end elevation of my improved car hold down, Fig. 2 is a top plan view of the same, and Fig. 3 is a view similar to Fig. 2 showing the dogs in position permitting the brake beam to pass.

As shown in the drawings, 10 indicates a cage or other apparatus for holding a car, such as, for example, a rotatable cage. This cage is provided in the usual manner with the rails 11. 12 indicates a car such as, for example, a mine car provided with the wheels 13 travelling on the rails 11. 14 indicates a projecting part on the car body which may be either a part of the body, the running gear or a brake beam or any other apparatus. It will be noted that the part 14 is just above the wheels 13 and that any dogs positioned immediately above the wheels 13 for the purpose of holding them on the rails, will necessarily lie in the path of travel of the part 14 as the car 12 moves into and out of position in the cage.

15 indicates one of the dogs in the cage and adapted to lie immediately above the wheel 13 when the car is spotted or in position in the cage. The dog 15 has no upward movement and consequently when the wheel is under the same as shown in Fig. 2, the wheel is held on the rail during the overturning movement of the dumping cage.

It will be seen that the part 14 attached to the car, however, will engage the dog 15 as the car moves from the cage. The direction of travel of the cars is indicated by the arrow in Fig. 2. In order to permit the part 14 to pass the dog without damage either to the dog or to the part itself, the dog 15 is pivoted on a vertical pivot 16 so that it can swing in a horizontal plane. A spring 17 yieldingly holds it in position above the wheel 13. As the car moves from the cage and the part 14 engages the dog 15 it is pivoted on the pivot 16 as shown in Fig. 3, permitting the part 14 to pass without damage. After the part 14 has passed, the spring 17 returns the dog to its operative position.

The dog $15^a$ is substantially the same in construction and operation as the dog 15 except that it is provided with a beveled surface 18 against which any projecting part such as the part 14 engages in pushing the dog to one side. In Fig. 2 the dog 15ª is shown pushed to one side permitting the part 14 to pass.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible in view of the prior art.

What I claim as new, and desire to secure by Letters Patent, is:

1. In combination with a car dumping structure provided with rails adapted to carry a car thereon, means for holding a car on the rails during a dumping operation of the structure, said means including a dog on the structure lying above a wheel of the car when in position on the structure, said dog being positively held against vertical movement and yieldingly held against movement in a substantially horizontal plane to permit parts on the car to pass during movement of the car on the rails.

2. In combination with a car dumping structure provided with rails adapted to carry a car thereon, means for holding a car on the rails during a dumping operation on the structure, said means including a dog on the structure adapted to lie above a wheel of the car when in position on the structure, said dog being positively held against vertical movement and yielding held against movement in a substantially horizontal plane.

3. In combination with a car dumping structure provided with rails adapted to carry a car thereon, means for holding a car on the rails during a dumping operation on the structure, said means including a dog on the structure having an operative position above a wheel of the car when in position on the structure, said dog adapted to be moved to inoperative position upon being engaged by a part on the car in its travel on the rails to permit such part to pass, and means urging said dog into operative position.

4. In combination with a car dumping structure provided with rails adapted to carry a car thereon, means for holding a car on the rails during a dumping operation on the structure, said means including a dog on the structure having an operative position above a wheel of the car when in position on the structure, said dog being movable in a substantially horizontal plane from operative position to inoperative position.

5. In combination with a car dumping structure provided with rails adapted to carry a car thereon, means for holding a car on the rails during a dumping operation on the structure, said means including a dog on the structure having an operative position above a wheel of the car when in position on the structure, said dog being movable in a substantially horizontal plane from operative position to inoperative position; and means urging said dog into operative position.

6. In combination with a car dumping structure provided with rails adapted to carry a car thereon, means for holding a car on the rails during a dumping operation on the structure, said means including a dog on the structure having an operative position above a wheel of the car when in position on the structure, said dog being pivoted on a substantially vertical pivot and movable thereon from an operative position to an inoperative position.

7. In combination with a car dumping structure provided with rails adapted to carry a car thereon, means for holding a car on the rails during a dumping operation on the structure, said means including a dog on the structure having an operative position above a wheel of the car when in position on the structure, said dog being pivoted on a substantially vertical pivot and movable thereon from an operative position to an inoperative position; and means urging said dog into operative position.

8. In combination with a car dumping structure provided with rails adapted to carry a car thereon, means for holding a car on the rails during a dumping operation on the structure, said means including a dog on the structure having an operative position above a wheel of the car when in position on the structure, said dog adapted to be moved from operative position to inoperative position upon being engaged by a part on the car in the path of which said dog lies during movement of the car on the rails.

9. In combination with a car dumping structure provided with rails adapted to carry a car thereon, means for holding a car on the rails during a dumping operation on the structure, said means including a dog on the structure having an operative position above a wheel of the car when in position on the structure, said dog adapted to be moved from operative position to inoperative position upon being engaged by a part on the car in the path of which said dog lies during movement of the car on the rails; and means urging said dog into operative position.

10. In combination with a car dumping structure provided with rails adapted to carry a car thereon, means for holding a car on the rails during a dumping operation of the structure, said means including a dog on the structure normally lying above a wheel of the car when in position on the structure, said dog being positively held so as to hold the car on the rails during a dumping operation, and yieldingly held so as to permit parts on the car, in the path of which said dog lies, to pass during the movement of the car on the rails.

In testimony whereof, I have hereunto set my hand this 18th day of February, 1926.

GEORGE N. SIMPSON.